United States Patent
Ozaki

(10) Patent No.: US 12,337,421 B2
(45) Date of Patent: Jun. 24, 2025

(54) BRAZING MATERIAL, METHOD FOR PRODUCING THE SAME, AND METHOD FOR PRODUCING METAL-CERAMICS BONDED SUBSTRATE

(71) Applicant: DOWA METALTECH CO., LTD., Tokyo (JP)

(72) Inventor: Ayumu Ozaki, Tokyo (JP)

(73) Assignee: DOWA METALTECH CO., LTD., Tokyo (JP)

( * ) Notice: Subject to any disclaimer, the term of this patent is extended or adjusted under 35 U.S.C. 154(b) by 163 days.

(21) Appl. No.: 17/914,853

(22) PCT Filed: Mar. 18, 2021

(86) PCT No.: PCT/JP2021/011235
§ 371 (c)(1),
(2) Date: Sep. 27, 2022

(87) PCT Pub. No.: WO2021/200242
PCT Pub. Date: Oct. 7, 2021

(65) Prior Publication Data
US 2023/0068210 A1  Mar. 2, 2023

(30) Foreign Application Priority Data
Mar. 31, 2020  (JP) ................ 2020-061887

(51) Int. Cl.
*B23K 35/30* (2006.01)
*B23K 35/02* (2006.01)
(Continued)

(52) U.S. Cl.
CPC ........ *B23K 35/3006* (2013.01); *B23K 35/025* (2013.01); *B23K 2103/12* (2018.08); *B23K 2103/52* (2018.08)

(58) Field of Classification Search
None
See application file for complete search history.

(56) References Cited

U.S. PATENT DOCUMENTS 5,955,686 A   9/1999  Sakuraba et al.
6,071,592 A   6/2000  Sakuraba et al.
(Continued)

FOREIGN PATENT DOCUMENTS

EP  1 298 108 A2  4/2003
JP  9-188582 A    7/1997
(Continued)

OTHER PUBLICATIONS

International Search Report and Written Opinion issued in International Patent Application No. PCT/JP2021/011235, dated Jun. 1, 2021, along with an English translation thereof.
(Continued)

*Primary Examiner* — Devang R Patel
(74) *Attorney, Agent, or Firm* — GREENBLUM & BERNSTEIN, P.L.C.

(57) ABSTRACT

Provided are a brazing material in paste form containing a powder mixture that contains titanium powder having an average particle diameter (D50) of 20 μm or less in an amount of 0.7 to 2.0 mass %, copper powder in an amount of 3 to 15 mass %, and silver powder as the remaining portion, and a vehicle, and techniques associated with the brazing material.

15 Claims, 1 Drawing Sheet

(51) Int. Cl.
*B23K 103/00* (2006.01)
*B23K 103/12* (2006.01)

(56) References Cited

U.S. PATENT DOCUMENTS

| | | | |
|---|---|---|---|
| 6,221,511 B1 | 4/2001 | Sakuraba et al. | |
| 9,780,011 B2 * | 10/2017 | Imamura | B23K 35/0244 |
| 2018/0255645 A1 | 9/2018 | Ideno et al. | |
| 2022/0009842 A1 | 1/2022 | Yuasa et al. | |

FOREIGN PATENT DOCUMENTS

| | | |
|---|---|---|
| JP | 9-283671 A | 10/1997 |
| JP | 10-251075 A | 9/1998 |
| JP | 11-29371 A | 2/1999 |
| JP | 11-130555 A | 5/1999 |
| JP | 2000246482 A * | 9/2000 |
| JP | 2001-48671 A | 2/2001 |
| JP | 2009-234895 A | 10/2009 |
| JP | 2017-41567 A | 2/2017 |
| JP | 2018-145047 A | 9/2018 |
| JP | 2020-139187 A | 9/2020 |
| WO | 2016/013651 A1 | 1/2016 |
| WO | 2020/105734 A1 | 5/2020 |

OTHER PUBLICATIONS

Translation of the International Preliminary Report on Patentability issued in International Patent Application No. PCT/JP2021/011235 dated Oct. 13, 2022.
Extended European Search Report that issued in the corresponding European Patent Application No. 21778786.0 dated Apr. 5, 2024.

* cited by examiner

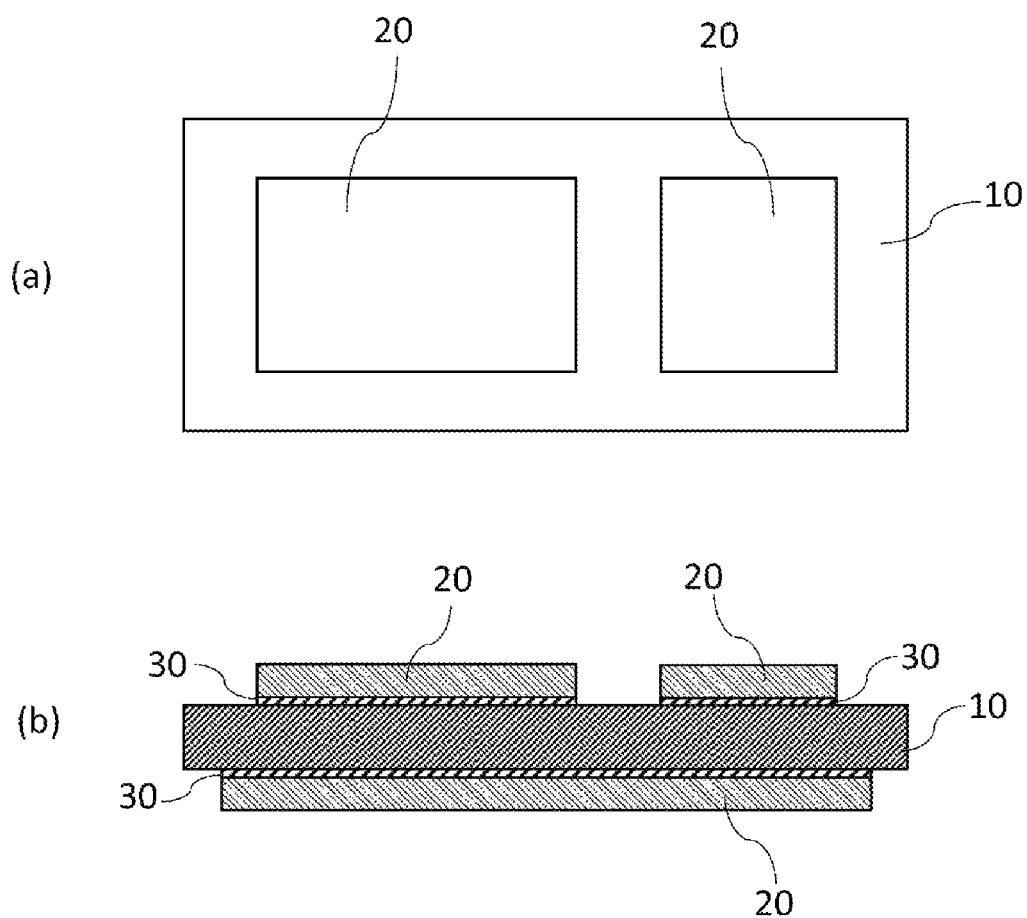

BRAZING MATERIAL, METHOD FOR PRODUCING THE SAME, AND METHOD FOR PRODUCING METAL-CERAMICS BONDED SUBSTRATE

TECHNICAL FIELD

The present invention relates to a brazing material, a method for producing the same, and a method for producing a metal-ceramics bonded substrate. Specifically, the present invention relates to a brazing material containing an active metal to be used to bond a metal plate to a ceramic substrate, a method for producing the same, and a method for producing a metal-ceramics bonded substrate in which the brazing material is used to bond a metal plate to a ceramic substrate.

BACKGROUND ART

Power modules are used to control a large amount of power used in electric cars, electric trains, machine tools, and the like. As an insulated circuit board for such a power module, used is a metal-ceramics bonded substrate that includes a ceramic substrate, a metal (circuit) plate that is bonded on one surface of the ceramic substrate and on which chip components and terminals are to be soldered, and a metal plate (for forming a heat dissipation plate) that is bonded to the other surface of the ceramic substrate and to which a heat dissipation plate is to be bonded and formed using a technique such as soldering.

In the metal-ceramics bonded substrate, copper or aluminum, which has high electric conductivity and high thermal conductivity, is often used as a material of the metal circuit plate and the metal plate for forming a heat dissipation plate, and an alumina substrate, aluminum nitride substrate, or silicon nitride substrate, which has high insulation properties, is used as the ceramic substrate. As a technique for bonding such a metal plate to a ceramic substrate, a bonding technique in which the metal plate and the ceramic substrate are bonded to each other via a brazing material containing an active metal through heating in vacuum, namely an active metal technique, is widely used.

Power modules are used in vehicles such as electric trains, and have been further applied to high-voltage fields because their density and switching speed have been increased due to improvement of the characteristics of power semiconductor chips. When a high voltage is applied to a metal-ceramics bonded substrate, partial discharge (corona discharge) occurs at a defect such as a void that is present at a bonding interface. If the partial discharge repeatedly occurs, dielectric breakdown may occur in the metal-ceramics bonded substrate, leading to damage on the power module. Also, the (bonding) defect such as a void may impair the heat dissipation properties of the metal-ceramics bonded substrate.

Patent Document 1 discloses a metal-ceramics bonded substrate that includes a ceramic substrate and a metal plate bonded to at least one surface of the ceramic substrate and in which a void in the bonding layer has a diameter of 0.65 mm or less. Patent Document 1 states that, with this metal-ceramics bonded substrate, corona discharge is suppressed and the withstanding voltage is 4 kV or more.

Patent Document 2 discloses a ceramics-metal composite circuit board in which the area ratio of voids at the bonding interface of the semiconductor installation portion on a metal plate bonded to the main surface of a ceramic substrate is 1.5% or less. Also, Patent Document 2 discloses use of an alumina substrate as the ceramic substrate. Patent Document 2 states that suppression of voids at the bonding interface leads to improvement of the heat dissipation properties.

CITATION LIST

Patent Documents

Patent Document 1: JP 2001-48671A
Patent Document 2: JP H9-283671A

SUMMARY OF INVENTION

Technical Problem

In recent years, regarding metal-ceramics bonded substrates for power modules to be used in vehicles such as electric trains, the number of chips installed on the metal circuit plate of one metal-ceramics bonded substrate has been increased, and therefore, metal-ceramics bonded substrates that have a relatively large area and include fewer bonding defects are in demand.

However, research conducted by the inventors of the present invention has revealed that the metal-ceramics bonded substrates and the methods for producing the same disclosed in Patent Documents 1 and 2 have a problem that it is difficult to sufficiently mitigate bonding defects such as voids and non-bonded portions when a metal-ceramics bonded substrate with an area (of the bonded portion) of larger than 20 $cm^2$ is formed through bonding. Also, it is generally known that, in the case where the area of the bonded region where a metal and ceramics (particularly nitride-based ceramics) are bonded to each other is large, it is difficult to suppress bonding defects compared with the case where the area of the bonded region is small.

It is an object of the present invention to provide a brazing material capable of sufficiently suppressing bonding defects even in such a large metal-ceramics bonded substrate with a large-area bonded region, a method for producing the same, and a method for producing a metal-ceramics substrate.

Solution to Problem

A first aspect of the present invention is
a brazing material in paste form including a powder mixture that contains titanium powder having an average particle diameter (D50) of 20 μm or less in an amount of 0.7 to 2.0 mass %, copper powder in an amount of 3 to 15 mass %, and silver powder as a remaining portion, and a vehicle.
A second aspect of the present invention is the aspect according to the first aspect,
wherein the titanium powder has an average particle diameter (D50) of 5 μm or more.
A third aspect of the present invention is the aspect according to the first or second aspect,
wherein the powder mixture contains the titanium powder in an amount of 0.9 to 1.8 mass %.
A fourth aspect of the present invention is the aspect according to any one of the first to third aspects,
wherein the powder mixture contains the copper powder in an amount of 5 to 13 mass %.
A fifth aspect of the present invention is the aspect according to any one of the first to fourth aspects,
wherein the powder mixture further contains titanium oxide powder in an amount of 1.0 mass % or less.

A sixth aspect of the present invention is
a method for producing a brazing material in paste form, including preparing a powder mixture that contains titanium powder having an average particle diameter (D50) of 20 μm or less in an amount of 0.7 to 2.0 mass %, copper powder in an amount of 3 to 15 mass %, and silver powder as a remaining portion, and kneading the powder mixture with a vehicle to form a paste.

A seventh aspect of the present invention is the aspect according to the sixth aspect,
wherein the titanium powder has an average particle diameter (D50) of 5 μm or more.

An eighth aspect of the present invention is the aspect according to the sixth or seventh aspect,
wherein the powder mixture contains the titanium powder in an amount of 0.9 to 1.8 mass %.

A ninth aspect of the present invention is the aspect according to any one of the sixth to eighth aspects,
wherein the powder mixture contains the copper powder in an amount of 5 to 13 mass %.

A tenth aspect of the present invention is the aspect according to any one of the sixth to ninth aspects,
wherein the powder mixture further contains titanium oxide powder in an amount of 1.0 mass % or less.

An eleventh aspect of the present invention is
a method for producing a metal-ceramics bonded substrate, including bonding a metal plate and a ceramic substrate to each other using the brazing material in paste form according to any one of the first to fifth aspects.

A twelfth aspect of the present invention is the aspect according to the eleventh aspect,
which includes applying the brazing material to one main surface of the ceramic substrate, arranging the metal plate on the applied brazing material in a contact state, and bonding the ceramic substrate and the metal plate to each other through heating in a vacuum atmosphere.

A thirteenth aspect of the present invention is the aspect according to the twelfth aspect,
which includes applying the brazing material to the other main surface of the ceramic substrate, arranging a metal plate on the applied brazing material in a contact state, and bonding the ceramic substrate and the metal plate to each other through heating in a vacuum atmosphere.

A fourteenth aspect of the present invention is the aspect according to any one of the eleventh to thirteenth aspects,
wherein the metal plate is made of copper or a copper alloy.

A fifteenth aspect of the present invention is the aspect according to any one of the eleventh to fourteenth aspects,
wherein the ceramic substrate contains one selected from alumina, aluminum nitride, and silicon nitride as a main component.

Advantageous Effects of Invention

The present invention can provide a brazing material capable of sufficiently suppressing bonding defects in a metal-ceramics bonded substrate, a method for producing the same, and a method for producing a metal-ceramics substrate.

BRIEF DESCRIPTION OF DRAWINGS

FIG. 1 shows a top view (a) and a cross-sectional view (b) of a metal-ceramics bonded substrate according to an embodiment of the present invention.

DESCRIPTION OF EMBODIMENTS

A brazing material in paste form according to the present invention is characterized by containing a powder mixture that contains titanium powder having an average particle diameter (D50) of 20 μm or less in an amount of 0.7 to 2.0 mass %, copper powder in an amount of 3 to 15 mass %, and silver powder as the remaining portion, and a vehicle. A method for producing a brazing material in paste form according to the present invention is characterized by including preparing a powder mixture that contains titanium powder having an average particle diameter (D50) of 20 μm or less in an amount of 0.7 to 2.0 mass %, copper powder in an amount of 3 to 15 mass %, and silver powder as the remaining portion, and kneading the powder mixture with a vehicle to form a paste.

Titanium Powder

The brazing material according to the present invention contains the titanium powder having an average particle diameter (D50) of 20 μm or less in an amount of 0.7 to 2.0 mass % (with respect to the total amount of the powder mixture). In the case where titanium powder having such a small particle diameter is used, when the brazing material in paste form is applied to a ceramic substrate, the number density of the titanium powder (that contributes to bonding) per area increases on a region to which the brazing material has been applied due to the particle diameter being smaller compared with that of titanium powder having an average particle diameter (D50) of larger than 20 μm, thus making it possible to distribute the titanium powder more uniformly. It is thus considered that the metal plate and the ceramic substrate are uniformly bonded to each other, thus making it possible to suppress bonding defects in the metal-ceramics bonded substrate. In addition, sufficient bonding strength can be achieved. The lower limit of the average particle diameter (D50) is preferably 5 μm or more, and more preferably 10 μm or more, from the viewpoint of handling safety. The "titanium powder" as used in the present invention means titanium powder or titanium hydride powder.

When the total amount of the powder mixture containing the titanium powder, the copper powder, the silver powder, and the like is taken as 100 mass %, the amount of the titanium powder is set to 0.7 to 2.0 mass %. If the amount of the titanium powder is too small, necessary bonding strength is not achieved when producing a metal-ceramics bonded substrate. If the amount of the titanium powder is too large, bonding defects tend to be suppressed, but thermal shock resistance may deteriorate. The amount of the titanium powder in the powder mixture is preferably 0.9 to 1.8 mass %.

The powder mixture may contain, for example, other powders such as Sn powder and In powder and impurity components in an amount of 1.0 mass % or less in addition to the titanium powder, the copper powder, and the silver powder, as long as the effects of the present invention are exhibited.

Copper Powder

The brazing material according to the present invention is characterized by containing the copper powder in an amount of 3 to 15 mass % (with respect to the total amount of the powder mixture). If the amount of the copper powder is too small or too large, bonding defects may increase. The amount of the copper powder is more preferably 5 to 13 mass %.

The copper powder and the silver powder form a fusion of copper and silver. This fusion acts to lower the melting temperature (bonding temperature) of the brazing material, and it is thus considered that the fusion has an effect to improve the thermal shock resistance of the metal-ceramics bonded substrate.

The average particle diameter (D50) of the copper powder used in the method for producing a brazing material according to the present invention is preferably 40 μm or less, and more preferably 20 μm or less. It is considered that, unlike the titanium powder, the copper powder does not form a reaction product at the bonding interface between the metal plate and the ceramic substrate (whereas titanium reacts with the component of the ceramic substrate to produce a reaction product), that is, the copper powder does not directly contribute to bonding, and therefore, the particle diameter has a smaller influence compared with the titanium powder. However, it is preferable to use copper powder having the above-mentioned particle diameter because clogging may occur if a brazing material having a large particle diameter is applied through screen printing or the like. The average particle diameter (D50) of the copper powder is more preferably 0.1 to 10 μm.

Silver Powder

The brazing material according to the present invention is characterized by containing the silver powder as the remaining portion excluding the titanium powder and the copper powder (with respect to the total amount of the powder mixture). As described above, the copper powder and the silver powder form a fusion of copper and silver. This fusion acts to lower the melting temperature (bonding temperature) of the brazing material, and it is thus considered that the fusion has an effect to improve the thermal shock resistance of the metal-ceramics bonded substrate.

The average particle diameter (D50) of the silver powder used in the method for producing a brazing material according to the present invention is preferably 40 μm or less, more preferably 20 μm or less, and even more preferably 0.1 to 10 μm. It is considered that, unlike the titanium powder, the silver powder does not form a reaction product at the bonding interface between the metal plate and the ceramic substrate (whereas titanium reacts with the component of the ceramic substrate to produce a reaction product), that is, the silver powder does not directly contribute to bonding, and therefore, the particle diameter has a smaller influence compared with the titanium powder.

Vehicle

The brazing material according to the present invention includes the above-mentioned powder mixture and a vehicle. The brazing material in paste form is produced by kneading the vehicle and the above-mentioned powder mixture. The vehicle includes a binder and a solvent, and it is sufficient that a commonly used organic binder and a solvent in which the binder is soluble are used.

For example, a vehicle that mainly contains an organic binder such as an acrylic binder or cellulose-based binder and an organic solvent such as α-terpineol or dibutyl phthalate can be used, and such a vehicle acts to bind the metal powders in a brazing material paste to form a paste.

Examples of the acrylic binder include poly(methyl methacrylate), poly(isobutyl methacrylate), and poly(normal-butyl methacrylate). Examples of the cellulose-based binder include ethylcellulose, methylcellulose, and nitrocellulose.

It is sufficient that the content and the like of such a vehicle are adjusted as appropriate such that appropriate thixotropy and viscosity are imparted to the brazing material in paste form. For example, the brazing material in paste form can be produced by adding the vehicle to the above-mentioned powder such that the amount of the vehicle added is 7 to 15 parts by weight when the total amount of the powder is taken as 100 parts by weight, and kneading the resultant mixture using a common kneading means such as a mortar, a triple roll mill, or a planetary mixer.

It is preferable that the content of the binder in the vehicle is 40 to 60 mass %, and the remaining portion is constituted by the solvent.

Titanium Oxide Powder

The above-mentioned powder mixture may also contain titanium oxide powder, and when the amount of the powder is taken as 100 mass %, the amount of the titanium oxide powder is 1.0 mass % or less. It is anticipated that adding the titanium oxide powder improves the thermal shock resistance, but if the addition amount is large, bonding defects will increase. Accordingly, the addition amount is preferably within the range above. The amount of the titanium oxide powder added to the powder mixture may be 0.1 to 0.6 mass %.

In view of the fact that clogging may occur if a brazing material having a large particle diameter is applied through screen printing or the like, the average particle diameter (D50) of the titanium oxide powder is preferably 50 μm or less.

Method for Producing Metal-Ceramics Bonded Substrate

A method for producing a metal-ceramics bonded substrate according to the present invention is characterized by including bonding a metal plate and a ceramic substrate to each other using the above-described brazing material in paste form.

The metal plate is used to form an electronic circuit or dissipate heat, and therefore, the metal plate is preferably made of copper or a copper alloy, which has excellent electric conductivity and excellent thermal conductivity. Also, the ceramic substrate is used in a metal-ceramics bonded substrate for forming a circuit, and therefore, it is preferable that the ceramic substrate contains one of alumina, aluminum nitride, and silicon nitride, which have excellent insulating properties, as a main component. A commercially available metal plate and a commercially available ceramic substrate can be used.

Hereinafter, the method for producing a metal-ceramics bonded substrate will be described with reference to FIG. 1.

A brazing material 30 in paste form as described above is applied to, using a technique such as screen printing, the substantially entire main surfaces on both sides of a ceramic substrate 10, or a portion of the surface of the ceramic substrate 10 that corresponds to a portion to which a metal plate 20 is to be bonded.

Depending on the composition of the brazing material, the weight per unit area of the brazing material applied is preferably within a range of approximately 0.08 to 0.50 mg/cm$^2$, and the thickness of the brazing material applied is preferably approximately 5 to 35 μm. If the weight per unit area of the brazing material is smaller than the range above, or the thickness of the brazing material is smaller than the range above, bonding strength between the metal plate and the ceramic substrate decreases. If the weight per unit area of the brazing material is large, or the thickness of the brazing material is large, thermal shock resistance such as heat-cycle properties may deteriorate. The weight per unit area of the brazing material applied is more preferably 0.12 to 0.40 mg/cm$^2$, and the thickness of the brazing material is more preferably 10 to 30 μm.

After the brazing material 30 applied to the ceramic substrate 10 has been dried at, for example, 50 to 150° C., the metal plates 20 are arranged on the surfaces of the brazing material 30 formed on both surfaces of the ceramic substrate. Due to this arrangement, a sandwich-like laminate in which the metal plates 20 are in contact with the ceramic substrate 10 via the brazing material 30 is obtained, and the laminate is then placed in a vacuum furnace as it is.

A weight is placed on the laminate placed in the vacuum furnace as needed, and the laminate is heated in a vacuum atmosphere to bond the metal plates 20 and the ceramic substrate 10 to each other via the brazing material 30. The heating (bonding) temperature is preferably set to 770 to 900° C., and may also be set to 790 to 860° C. The laminate is kept at the bonding temperature for about 10 to 120 minutes. From the industrial viewpoint, the laminate is preferably kept at the bonding temperature for 15 to 60 minutes in view of productivity and bonding stability (less bonding defects, larger bonding strength). A binder removal process for removing organic substances in the brazing material 30 may be performed by keeping the laminate, for example, at 500 to 700° C. for 30 to 60 minutes before the temperature reaches the bonding temperature.

After the metal plates 20 and the ceramic substrate 10 have been bonded in this manner, the laminate is removed from the vacuum furnace, and thus a metal-ceramics bonded substrate in which the metal plates 20 and the ceramic substrate 10 are bonded to each other via the brazing material 30 can be obtained.

The larger the bonded area is, the more likely it is that bonding defects such as a void and a non-bonded portion will occur. Therefore, in order to effectively utilize the effects of the present invention, the present invention is preferably applied to a metal-ceramics bonded substrate with a bonded area of 25 cm$^2$ or more, and more preferably to a metal-ceramics bonded substrate with a bonded area of 36 cm$^2$ or more.

Thereafter, a circuit may be formed using a conventional technique in order to obtain a metal-ceramics bonded substrate provided with a circuit, and a surface treatment such as Ni plating or rustproofing may be performed on the surfaces of the metal plates as needed.

For example, when the brazing material 30 is applied to the entire surface of the ceramic substrate 10 and then the metal plate 20 is bonded thereto as described above, the metal plate 20 may be shaped into a circuit shape as follows: an etching resist pattern having a predetermined circuit shape or the like is formed on the metal plate 20, the metal plate 20 such as a copper plate is removed through etching processing in which a chemical solution containing copper chloride and a hydrogen peroxide solution, or the like is used, and then the brazing material 30 is removed using a chemical solution for removing the brazing material 30 that contains hydrogen fluoride, a chelating agent, and the like.

Also, for example, in the surface treatment, the surface of the metal plate 20 may be Ni-plated through electroless Ni—P plating or Ni electroplating, or the metal plate 20 may be rustproofed using a rustproofing agent.

EXAMPLES

Hereinafter, examples of the brazing material, the method for producing a brazing material, and the method for producing a metal-ceramics bonded substrate according to the present invention will be described in detail.

Example 1

An aluminum nitride substrate (manufactured by Tokuyama Corporation) with a length of 68 mm, a width of 68 mm, and a thickness of 0.6 mm was prepared as a ceramic substrate.

A brazing material (containing an active metal) in paste form was produced by adding 13.8 g of a vehicle containing an acrylic binder and a solvent to 100 g of a powder containing commercially available titanium powder (purity: 99.9 mass % or more) in an amount of 1.7 mass %, commercially available copper powder (electrolytic copper powder) in an amount of 10 mass %, commercially available titanium oxide powder (rutile-type titanium oxide (IV)) in an amount of 0.5 mass %, and commercially available silver powder in an amount of 87.8 mass % (corresponding to the remaining portion), and then kneading the resultant mixture using a mortar and a triple roll mill.

Commercially available titanium powder having an average particle diameter (median diameter D50) of 26.902 μm was pulverized into those having a smaller particle diameter and was then sieved out (sized). The thus obtained powder was used as the titanium powder. The average particle diameter D50 thereof was 12.130 μm.

The copper powder used had an average particle diameter (D50) of 7.3 μm, and the titanium oxide powder used had an average particle diameter (D50) of 45 μm.

The silver powder used had an average particle diameter (D50) of 0.5 μm.

The average particle diameters (D50) above were measured on the volumetric basis using a laser diffraction/scattering particle size distribution analyzer (Laser Micron Sizer LMS-3000, manufactured by Seishin Enterprise Co., Ltd.) with pure water being used as a dispersion medium.

This active-metal-containing brazing material in paste form was applied to the entire surfaces on both the front side and the back side of the aluminum nitride substrate through screen printing using a screen printer with a screen printing plate having an emulsion thickness of 10 μm. Note that the application amount per unit area of titanium serving as an active metal in the brazing material was 0.271 mg/cm$^2$.

Next, after the brazing material applied to the surfaces on the front side and the back side of the aluminum nitride substrate was dried, copper plates having a length of 70 mm, a width of 70 mm, and a thickness of 0.25 mm were arranged such that they were in contact with the brazing material and covered the entire main surfaces on the front side and the back side of the aluminum nitride substrate, and thus a laminate was produced. This laminate was placed in a vacuum furnace and was then heated to and kept at 835° C. for 40 minutes in vacuum (degree of vacuum: $1.0 \times 10^{-4}$ torr or less) with a 200-g weight being placed on the laminate to bond the aluminum nitride substrate and the copper plates to each other. In this manner, 58 metal-ceramics bonded substrates in which the copper plates were bonded to both surfaces of the aluminum nitride substrate via the brazing material were produced.

Bonding Defect Ratio

Regarding the thus obtained 58 metal-ceramics bonded substrates, the area ratio (referred to as a "bonding defect ratio") of a bonding defect region (void, non-bonded portion) to a bonded region (region to which the active-metal brazing material was applied) was calculated using an ultrasonic defectscope (ultrasonic imaging device FS100II, manufactured by Hitachi Power Solutions Co., Ltd.) with the probe frequency being set to 50 MHz. As a result, the average of the bonding defect ratio was 0.321 area %, indicating that bonding defects was considerably suppressed, which was favorable.

Etching resist ink was applied in a circuit shape to the surface of one copper plate on the metal-ceramics bonded substrate, and etching resist ink was applied, through screen printing, to a region on the surface of the other copper plate excluding a 1-mm width portion at the outer peripheral edge of the ceramic substrate in order to form a rectangular metal plate for bonding a heat dissipation plate. Thereafter, the applied etching resist ink was irradiated with ultraviolet rays and was thus cured, unnecessary portions of the copper plates and the brazing material present in the regions where no etching resist had been formed were removed using a chemical solution, and then the etching resist was removed. Thus, a metal-ceramics bonded circuit board was obtained.

Thermal Shock Resistance

The metal-ceramics bonded circuit board was placed in a batch furnace in a reducing atmosphere containing $N_2$ gas and $H_2$ gas at a ratio of 4:1 (volume ratio), and was passed through the furnace while performing one heat cycle as follows: a time period from when the metal-ceramics bonded circuit board was placed to when the temperature reached the highest temperature was set to 6 minutes, the highest temperature was set to 380° C., a time period when the metal-ceramics bonded circuit board was kept at the highest temperature was set to 10 minutes, and a time period when the temperature in the furnace was lowered from the highest temperature to 50° C. was set to 5 minutes. After the metal-ceramics bonded circuit board had been passed through the furnace 10 times, the surface of the ceramic substrate was observed under a stereoscopic microscope to confirm whether or not the surface was cracked. As a result, the surface was not cracked, indicating that the thermal shock resistance was favorable. This thermal shock resistance is also referred to as "furnace passing tolerance".

Bonding Strength

The copper plate on the metal-ceramics bonded circuit board was pulled off the aluminum nitride substrate, and the bonding strength at this time was measured in accordance with the 90° peel test. As a result, the bonding strength was 160 N/cm, which was favorable.

Example 2

Metal-ceramics bonded substrates were produced in the same manner as in Example 1, except that the amounts of the titanium powder, the copper powder, the titanium oxide powder, and the silver powder with respect to the total amount of the powder in the brazing material were respectively 1.0 mass %, 6.0 mass %, 0.5 mass %, and 92.5 mass %, titanium powder having a D50 particle diameter of 17.644 μm selected as fine particles through sieving (sizing) was used, and the application amount per unit area of titanium was 0.163 mg/cm².

The obtained metal-ceramics bonded substrates and metal-ceramics bonded circuit boards were evaluated in the same manner as in Example 1. The bonding defect ratio was 0.339 area %, which was very small. The ceramic substrate was not cracked after being passed through the furnace 10 times, indicating that the thermal shock resistance was favorable. The bonding strength was 196 N/cm, which was favorable.

Example 3

Metal-ceramics bonded substrates and metal-ceramics bonded circuit boards were produced in the same manner as in Example 2, except that the amounts of the titanium powder, the copper powder, the titanium oxide powder, and the silver powder with respect to the total amount of the powder in the brazing material were respectively 1.7 mass %, 6.0 mass %, 0.5 mass %, and 91.8 mass %, and the application amount per unit area of titanium was 0.277 mg/cm².

The obtained metal-ceramics bonded substrates and metal-ceramics bonded circuit boards were evaluated in the same manner as in Example 1. The bonding defect ratio was 0.337 area %, which was very small. The ceramic substrate was not cracked after being passed through the furnace 10 times, indicating that the thermal shock resistance was favorable. The bonding strength was 247 N/cm, which was favorable.

Comparative Example 1

Metal-ceramics bonded substrates were produced in the same manner as in Example 1, except that commercially available titanium powder having a particle diameter (median diameter D50) of 26.902 μm was used as the titanium powder (without being pulverized), and the application amount per unit area of titanium was 0.270 mg/cm².

The obtained metal-ceramics bonded substrates were evaluated in the same manner as in Example 1. The bonding defect ratio was 1.659 area %, indicating that the defect area was large, which was not favorable.

Comparative Example 2

Metal-ceramics bonded substrates were produced in the same manner as in Example 2, except that commercially available titanium powder having a particle diameter (median diameter D50) of 26.902 μm was used as the titanium powder (without being pulverized).

The obtained metal-ceramics bonded substrates were evaluated in the same manner as in Example 1. The bonding defect ratio was 63 area %, indicating that the defect area was very large (i.e., a non-bonded region was large), which means that these metal-ceramics bonded substrates could not be provided as final products.

Comparative Example 3

Metal-ceramics bonded substrates were produced in the same manner as in Example 3, except that commercially available titanium powder having a particle diameter (median diameter D50) of 26.902 μm was used as the titanium powder (without being pulverized), and the application amount per unit area of titanium was 0.282 mg/cm².

The obtained metal-ceramics bonded substrates were evaluated in the same manner as in Example 1. The bonding defect ratio was 0.855 area %, indicating that the defect area was large, which was not favorable.

Comparative Example 4

Metal-ceramics bonded substrates were produced in the same manner as in Example 3, except that the amounts of the titanium powder, the copper powder, the titanium oxide powder, and the silver powder with respect to the total amount of the powder in the brazing material were respectively 1.7 mass %, 16.0 mass %, 0.5 mass %, and 81.8 mass %.

The obtained metal-ceramics bonded substrates were evaluated in the same manner as in Example 1. The bonding defect ratio was 0.869 area %, indicating that the defect area was large, which was not favorable.

Table 1 shows the evaluation results of the above-described brazing materials and metal-ceramics bonded substrates.

TABLE 1

| | Powder mixture | | | | | | Thermal |
|---|---|---|---|---|---|---|---|
| | Ti powder | | | | | Bonding | shock |
| | Composition mass % | Average particle diameter (D50) μm | Cu powder Composition mass % | TiO₂ powder Composition mass % | Ag powder Composition mass % | defect ratio Area % | resistance After 10 times |
| Ex. 1 | 1.7 | 12.130 | 10.0 | 0.5 | Remaining portion (87.8) | 0.321 | No cracks |
| Ex. 2 | 1.0 | 17.644 | 6.0 | 0.5 | Remaining portion (92.5) | 0.339 | No cracks |
| Ex. 3 | 1.7 | 17.644 | 6.0 | 0.5 | Remaining portion (91.8) | 0.337 | No cracks |
| Comp. Ex. 1 | 1.7 | 26.902 | 10.0 | 0.5 | Remaining portion (87.8) | 1.659 | No cracks |
| Comp. Ex. 2 | 1.0 | 26.902 | 6.0 | 0.5 | Remaining portion (92.5) | 63 | No cracks |
| Comp. Ex. 3 | 1.7 | 26.902 | 6.0 | 0.5 | Remaining portion (91.8) | 0.855 | No cracks |
| Comp. Ex. 4 | 1.7 | 17.644 | 16.0 | 0.5 | Remaining portion (81.8) | 0.869 | — |

REFERENCE SIGNS LIST

10 Ceramic substrate
20 Metal plate
30 Brazing material

The invention claimed is:

1. A brazing material in paste form comprising:
   a powder mixture that contains titanium powder having an average particle diameter (D50) of 20 μm or less in an amount of 0.7 to 2.0 mass %, copper powder in an amount of 10 to 15 mass %, and silver powder having an average particle diameter (D50) of less than 1 μm as a remaining portion; and
   a vehicle.
2. The brazing material according to claim 1, wherein the titanium powder has an average particle diameter (D50) of 5 μm or more.
3. The brazing material according to claim 1, wherein the powder mixture contains the titanium powder in an amount of 0.9 to 1.8 mass %.
4. The brazing material according to claim 1, wherein the powder mixture contains the copper powder in an amount of 10 to 13 mass %.
5. The brazing material according to claim 1, wherein the powder mixture further contains titanium oxide powder in an amount of 1.0 mass % or less.
6. A method for producing a brazing material in paste form, comprising:
   preparing a powder mixture that contains titanium powder having an average particle diameter (D50) of 20 μm or less in an amount of 0.7 to 2.0 mass %, copper powder in an amount of 10 to 15 mass %, and silver powder having an average particle diameter (D50) of less than 1 μm as a remaining portion; and
   kneading the powder mixture with a vehicle to form a paste.
7. The method for producing a brazing material according to claim 6, wherein the titanium powder has an average particle diameter (D50) of 5 μm or more.
8. The method for producing a brazing material according to claim 6, wherein the powder mixture contains the titanium powder in an amount of 0.9 to 1.8 mass %.
9. The method for producing a brazing material according to claim 6, wherein the powder mixture contains the copper powder in an amount of 10 to 13 mass %.
10. The method for producing a brazing material according to claim 6, wherein the powder mixture further contains titanium oxide powder in an amount of 1.0 mass % or less.
11. A method for producing a metal-ceramics bonded substrate, comprising
   bonding a metal plate and a ceramic substrate to each other using the brazing material in paste form according to claim 1.
12. The method for producing a metal-ceramics bonded substrate according to claim 11, comprising:
   applying the brazing material to one main surface of the ceramic substrate;
   arranging the metal plate on the applied brazing material in a contact state; and
   bonding the ceramic substrate and the metal plate to each other through heating in a vacuum atmosphere.
13. The method for producing a metal-ceramics bonded substrate according to claim 12, further comprising:
   applying the brazing material to the other main surface of the ceramic substrate;

arranging a metal plate on the applied brazing material in a contact state; and bonding the ceramic substrate and the metal plate to each other through heating in a vacuum atmosphere.

14. The method for producing a brazing material according to claim 11, wherein the metal plate is made of copper or a copper alloy.

15. The method for producing a brazing material according to claim 11, wherein the ceramic substrate contains one selected from alumina, aluminum nitride, and silicon nitride as a main component.

* * * * *